Figure 1:
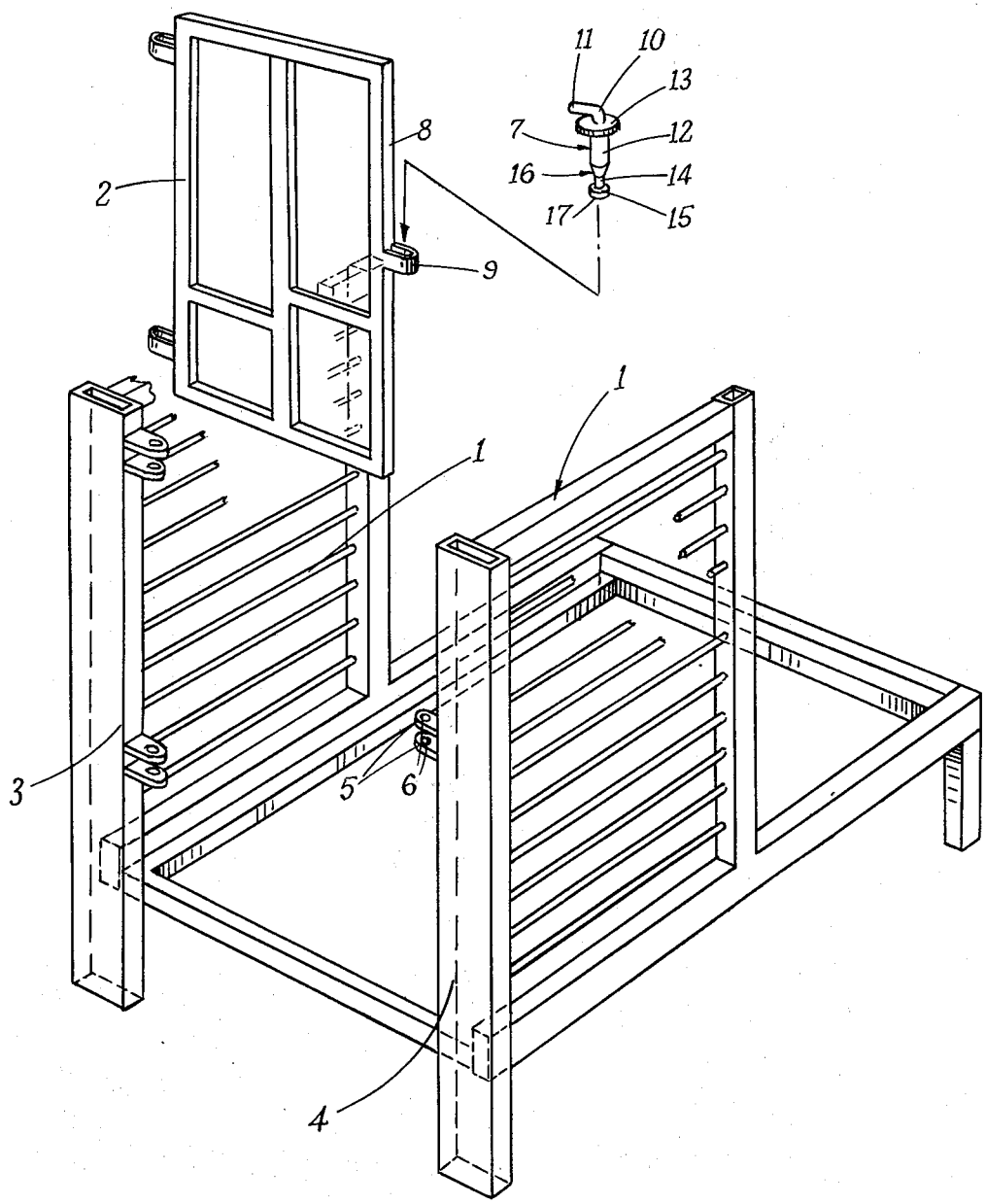

United States Patent [19]

Dormehl

[11] 4,062,322
[45] Dec. 13, 1977

[54] GATE LOCKING MEANS

[76] Inventor: Peter G. Dormehl, 45, Regent Street, Yeoville, Johannesburg, Transvaal Province, South Africa

[21] Appl. No.: 671,491

[22] Filed: Mar. 29, 1976

[51] Int. Cl.² .............................................. A01K 1/02
[52] U.S. Cl. .................................... 119/27; 85/5 CP; 403/49
[58] Field of Search ....................... 119/27, 20, 17, 19, 119/11, 99, 147–150; 292/2, 145, 150, 227, 183–198, 300, 103; 49/394, 160; 403/376, 153, 49, 408, 93, 65; 16/169; 85/5 CP, 5 M, 8.9

[56] References Cited

U.S. PATENT DOCUMENTS

| | | | |
|---|---|---|---|
| 1,030,527 | 6/1912 | Nelson | 403/153 |
| 2,483,660 | 10/1949 | Morris et al. | 403/376 |
| 2,865,076 | 12/1958 | Newton et al. | 85/5 CP |
| 3,146,003 | 8/1964 | Ronde | 85/5 CP |
| 3,481,095 | 12/1969 | Beziat | 403/49 |
| 3,650,245 | 3/1972 | Karnes | 119/20 |
| 3,766,599 | 10/1973 | Ullman | 16/169 |
| 3,787,134 | 1/1974 | Burr | 403/408 |
| 3,869,887 | 3/1975 | Zeit | 292/145 |

FOREIGN PATENT DOCUMENTS 1,010,030  6/1957  Germany .............................. 403/49

Primary Examiner—Louis G. Mancene
Assistant Examiner—Peter K. Skiff
Attorney, Agent, or Firm—Cushman, Darby & Cushman

[57] ABSTRACT

An improved releasable gate locking device for preventing the opening thereof by animals. The device is used with a gate and fence structure and comprises a locking pin which includes a head portion having upper and lower walls spaced apart along the pin's axis so as to define a groove therebetween. The lower wall is at right angles to the pin's axis and the upper wall is inclined away from the pin's axis. The pin cooperates with two spaced apart plates having aligned holes for receipt of the pin and the pin will swivel if not raised in a vertical direction. The lower wall prevents the pin from being withdrawn since swiveling of the pin causes the lower wall to engage the lower plate. The upper inclined wall serves to guide the pin back into proper position when a lifting force on the pin is released.

3 Claims, 1 Drawing Figure

U.S. Patent  Dec. 13, 1977  4,062,322

GATE LOCKING MEANS

This invention relates to gate locking means and in particular to releasable locking means particularly adapted for agricultural purposes.

It often happens that head gates of calf pens or stalls, as well as other agricultural types of gates, are locked in a closed condition by means of barrel bolts or, more often, by pins extending vertically downwards through apertures associated with the gate and adjacent frame member.

In the case of the simple arrangement of a pin, which is the least expensive locking means known to applicant, the disadvantage is that an animal confined behind the gate can and sometimes does remove the pin with its tongue. Consequently appreciably more complicated locking means may be used in order to prevent this from happening.

It is the object of this invention to provide a simple pin type of locking means which will not be capable of easy removal from its operative position in the manner described above.

According to this invention there is provided a locking pin for the above generally defined purpose and wherein an upper region of the pin is provided with means whereby it may be supported on a plate or the like, and the opposite end is provided with a deep circumferential groove therein which defines a head at said end.

Further features of the invention provide for the said means to be a washer welded to the pin, for the pin adjacent the washer to have a right angled bend therein to define a handle and for the groove to have its wall remote from the handle at substantially right angles to the axis of the pin and the opposite wall to diverge from the former.

The invention will be more fully understood from the following description of one application of the invention which is described in association with calf pens having head gates which can be opened as and when required. This application of the invention is illustrated in the accompanying drawing;

FIG. 1 is an isometric view of a calf pen.

The calf pen illustrated in FIG. 1 is of known design having side walls 1 and a head gate 2 hingedly supported on the frame member 3 defining the front end of one of the side walls. The frame member 4 defining the front end of the other side wall has between its ends a pair of spaced horizontally orientated plates 5 welded thereto, each perforated with a circular hole 6 of suitable dimensions to receive a locking pin 7.

The plates extend towards the adjacent frame member 8 of the head gate which carries a horizontally orientated outwardly directed U-shaped locking member 9 located approximately mid-way between the plates.

The locking pin has a right angled bend 10 therein which defines a handle portion 11 and an operative portion 12 of the pin. A washer 13 is welded to the pin adjacent the bend and at the upper end of the operative portion 12 such that the washer in the operative position supports the pin on the upper plate as illustrated.

The pin extends beyond the lower plate and a short distance below the latter is provided with a deep circumferential groove 14 therein. The groove is somewhat wider than the thickness of the plates and has its side wall 15 nearest the lower end of the pin formed at right angles to the axis thereof. The other side wall 16 of the groove diverges away from the first mentioned side wall 15 and the groove thus defines a head 17 at the lower end of the pin.

With the above arrangement and the pin in an operative location, should an animal try to remove it with its tongue the pin will, due to the invariably non-axial force applied to the pin, swivel as the groove is moved into location on the lower plate. The head will thus abut the underside of the lower plate and prevent further withdrawal of the pin. Upon release of the pin the inclined side wall of the groove will co-operate with the hole in the lower plate to guide the pin back into its original position as it falls under the influence of gravity.

It will be understood that many variations may be made to the above described embodiment of the invention without departing from the scope thereof. In particular, the pin may have any suitable cross-sectional shape and any suitable handle formation at its one end. Also, the pin could simply be cross shaped in cross-section, thereby saving in materials of construction.

What I claim as new and desire to secure by Letters Patent is:

1. In combination an animal head gate and frame assembly wherein the head gate is hingedly supported on hinges secured to the frame and cooperating formations on the edge of the head gate remote from the hinges and the adjacent portion of the frame, the formations being adapted to receive a locking pin having an axis and upper and lower regions said pin having support means for supporting said pin on said formation on the adjacent portions of said frame, said support means being positioned in the upper region of said pin, said pin having a head end at the lower region of said pin, said head end comprising a first and second wall means vertically spaced apart along the axis of said pin for defining a groove therebetween, said hinges secured to said frame comprising vertically spaced apart plates each having means defining a hole therein for receiving said pin, said groove being slightly wider than the distance said plates are spaced apart, said first wall means being formed at right angles to the axis of said pin, said second wall means being positioned between said first wall means and said support means and at an angle with the axis of said pin so that said second wall means diverges away from said first wall means.

2. The combination animal head gate and frame assembly as in claim 1 wherein said pin has a substantially right angled bend in the upper portion above said support means to define a handle portion.

3. The combination animal head gate and frame assembly as in claim 1 wherein said support means comprises a washer welded to said pin.

* * * * *